United States Patent
Cooper et al.

(10) Patent No.: US 9,851,771 B2
(45) Date of Patent: Dec. 26, 2017

(54) DYNAMIC POWER MEASUREMENT AND ESTIMATION TO IMPROVE MEMORY SUBSYSTEM POWER PERFORMANCE

(71) Applicant: Intel Corporation, Santa Clara, CA (US)

(72) Inventors: Lawrence A Cooper, Olympia, WA (US); Justin J Song, Olympia, WA (US); Xiuting C Man, Portland, OR (US); Nagi Aboulenein, King City, OR (US); Christopher E Cox, Placerville, CA (US); Rebecca Z Loop, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 151 days.

(21) Appl. No.: 14/142,808

(22) Filed: Dec. 28, 2013

(65) Prior Publication Data
US 2015/0185797 A1 Jul. 2, 2015

(51) Int. Cl.
*G06F 1/32* (2006.01)
*G06F 1/28* (2006.01)

(52) U.S. Cl.
CPC .............. *G06F 1/28* (2013.01); *G06F 1/32* (2013.01); *G06F 1/324* (2013.01); *G06F 1/3225* (2013.01); *G06F 1/3275* (2013.01); *G06F 1/3296* (2013.01); *Y02B 60/1217* (2013.01); *Y02B 60/1225* (2013.01); *Y02B 60/1228* (2013.01); *Y02B 60/1285* (2013.01)

(58) Field of Classification Search
CPC .............. G06F 1/32; G06F 1/28; G06F 1/26
USPC ....... 713/300, 310, 320, 321, 322, 323, 324, 713/330, 340, 375
See application file for complete search history.

(56) References Cited

U.S. PATENT DOCUMENTS

| | | | |
|---|---|---|---|
| 6,662,278 B1 * | 12/2003 | Kahn ................. | G06F 1/206 365/211 |
| 8,412,479 B2 * | 4/2013 | David ................. | G06F 1/3225 323/281 |
| 2003/0229762 A1 * | 12/2003 | Maiyuran ........... | G06F 12/0215 711/137 |
| 2006/0120282 A1 * | 6/2006 | Carlson .............. | H04L 12/2602 370/229 |
| 2007/0283178 A1 * | 12/2007 | Dodeja ............... | G06F 1/3203 713/324 |
| 2009/0052372 A1 * | 2/2009 | Durazzo ............. | H04W 52/225 370/318 |
| 2009/0322697 A1 * | 12/2009 | Cao .................... | G06F 3/0416 345/173 |
| 2010/0153954 A1 * | 6/2010 | Morrow .............. | G06F 1/329 718/102 |
| 2010/0191997 A1 * | 7/2010 | Dodeja ............... | G06F 1/3225 713/323 |

(Continued)

*Primary Examiner* — Phil Nguyen
*Assistant Examiner* — Keshab Pandey
(74) *Attorney, Agent, or Firm* — Compass IP Law PC

(57) ABSTRACT

Dynamic monitoring of current draw by a memory device or memory subsystem can enable a power management system to adjust a memory access performance parameter based on monitored power usage. The system can generate a power usage characterization for the memory device and/or memory subsystem based on monitoring current draw for a known pattern, and then subsequently use the power usage characterization to determine how to adjust the memory access performance parameter.

21 Claims, 8 Drawing Sheets

(56) References Cited

U.S. PATENT DOCUMENTS

| | | | | |
|---|---|---|---|---|
| 2010/0287394 A1* | 11/2010 | Branover | .............. | G06F 1/3203 713/323 |
| 2012/0095607 A1* | 4/2012 | Wells | .................... | G06F 1/3203 700/291 |
| 2013/0073785 A1* | 3/2013 | Emma | ................. | G06F 12/0223 711/103 |
| 2013/0121157 A1* | 5/2013 | Logvinov | ........... | H04L 41/0833 370/238 |

* cited by examiner

DYNAMIC POWER MEASUREMENT AND ESTIMATION TO IMPROVE MEMORY SUBSYSTEM POWER PERFORMANCE

FIELD

Embodiments of the invention are generally related to power management, and more particularly to dynamically measuring and estimating power performance parameters for a memory subsystem.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2013, Intel Corporation, All Rights Reserved.

BACKGROUND

Computing and electronic devices rely on memory devices to store data and code for their various functions. As computing devices have increased in computational performance, they have included more and more storage and memory to meet the needs of the programming and computing performed on the devices. In mobile computing devices, controlling power consumption is a key design focus. Memory devices and memory subsystems consume a significant amount of total power consumption in low power and other mobile devices.

Power management of memory devices has traditionally been performed as an open loop process, relying on table of memory device "weights" generated from the device manufacturers. One traditional approach to power management is RAPL (running average power limit), which employs such an open loop process. Computing devices include the tables in initialization systems and project worst case memory power scenarios and power regulation strategies based on the tables. It will be understood that the tables indicate ranges and/or worst case performance parameters, without any way to account for the performance parameters of a specific memory device. Thus, the memory power projections will typically over-predict actual power, but could also fail to predict sufficient power usage for outlier parts. The over-prediction of power can result in a system performing under its optimal level for the power consumption allowed. The failure to predict outlier parts could cause overheating in the platform and/or failure.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
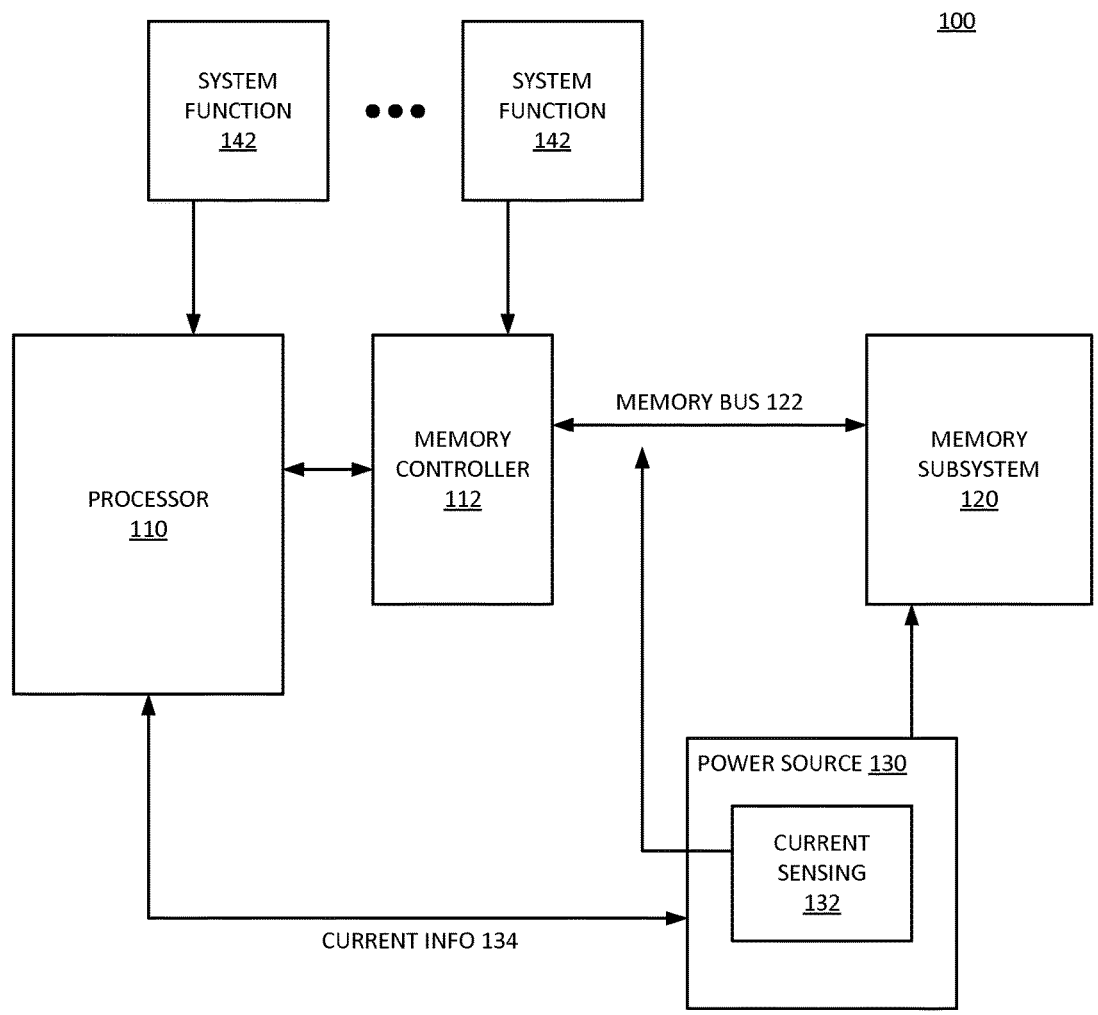
FIG. 1 is a block diagram of an embodiment of a system having a power source that monitors specific current usage by a memory subsystem.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, a power management system can characterize actual performance parameters for a specific memory device or memory subsystem. The characterization is based on monitoring current draw for a known traffic pattern or patterns. The power management system can perform dynamic monitoring of current draw by the memory device or memory subsystem, and adjust a performance parameter of the memory device or memory subsystem based on the monitored current draw information and characterization of the memory device or memory subsystem.

A power management system includes a power manager and sensors and/or other devices that can provide power input information. The power manager is a module or component that controls power management operations for a computing device in which the power management system operates. In one embodiment, the power manager is executed by a processing device that controls the computing device. Thus, in one embodiment, the processing device can execute the power management system. All or part of the power management system can be part of another subsystem, such as being a process or component of the other system.

In one embodiment, the power management system includes sensors from a voltage regulator (VR) or other power source within a computing device. In one embodiment, a VR includes a power management integrated circuit (PMIC), which is a programmable microcontroller designed to provide power management services to the VR. The power management system can obtain current sensing information from the PMIC or comparable microcontroller on a VR or power source, and use the information to train operating or performance parameters for a memory subsystem. Thus, the power management system can characterize the power usage behavior of the specific memory subsystem, and use that information for power management of the memory subsystem. Power management of the memory subsystem includes setting parameters (e.g., voltage, frequency, bandwidth, traffic source (load balancing)) for operation of the memory subsystem. Thus, the power management system can perform memory subsystem power modeling and regulation based on observed data about the memory subsystem. It will be understood that reference to a memory subsystem can refer to one or more memory devices and/or associated control logic/devices.

Training the operating parameters includes learning the memory subsystem parameters needed to model memory subsystem power. The training enables tighter (e.g., higher resolution or more accuracy) power estimation and enables improved memory subsystem power regulation. The training enables realtime memory modeling, which improves memory power regulation. Memory power is a function of memory device parameters, memory access traffic, and overall platform and memory configuration.

It will be understood that traditionally specific memory device parameters are an unknown factor, because the parameters vary significantly across different vendors and across different technologies (e.g., DDR3 vs LPDDR3). It will also be understood that parameters vary across process generations, in which the same device is made with different process geometries, such as scaling from geometries in the range of 30 nm to devices in the range of 20 nm). It will also be understood that parameters vary across lots within a technology and process generation, such as different batches of memory devices or devices made at different fabrication facilities.

Memory access traffic is a controllable factor. Memory access traffic is controlled by the memory controller or comparable memory access interface control logic. For simplicity, the expression memory controller is used to refer to a device or circuit that controls the interface with the memory subsystem/memory device. The memory controller can be integrated into the processing device, be part of a system on a chip (SOC) including the processing device, or be a standalone device. The memory controller defines memory activates, reads versus writes, refreshes, power-downs, and other activity interfacing with the memory subsystem. The type and timing of the memory traffic is controlled by the memory controller, and represents a significant factor in memory power consumption.

The platform and/or memory subsystem configuration is a known or knowable factor. The configuration can include memory capacity, channel width and count, devices per channel, number of ranks, DIMMs (dual inline memory modules) per channel, or other information. The configuration is relevant to the operation of the memory subsystem and the memory controller, and thus has a significant influence on memory power consumption.

Reference to memory devices can apply to different memory types. Memory devices are generally volatile memory devices. Volatile memory is memory whose state (and therefore the data stored on it) is indeterminate if power is interrupted to the device. Such devices typically require refreshing the data stored in the device to maintain state. For example, memory subsystems commonly use DRAM (dynamic random access memory) which is one example of a memory device as described herein, or some variant such as synchronous DRAM (SDRAM). Thus, the memory subsystem described herein is compatible with any of a number of memory technologies, such as DDR3 (dual data rate version 3, original release by JEDEC (Joint Electronic Device Engineering Council) on Jun. 27, 2007, currently on release 21), DDR4 (DDR version 4, initial specification published in September 2012 by JEDEC), LPDDR4 (low power dual data rate version 4, specification in development by JEDEC as of the filing of this application), WIO2 (Wide IO2, specification in development by JEDEC as of the filing of this application), and/or others, and technologies based on derivatives or extensions of such specifications.

FIG. 1 is a block diagram of an embodiment of a system having a power source that monitors specific current usage by a memory subsystem. System 100 includes memory subsystem 120, which is supplied power by power source 130. Power source 130 also monitors power usage by memory subsystem 120. In one embodiment, system 100 includes processor 110. In one embodiment, instead of or in addition to processor 110, system 100 can include control logic that provides the processing necessary to perform the power management described.

In one embodiment, system 100 compares power observed by current sensing components 132 of power source 130 to projected power for the memory subsystem calculated by processor 110 from a functional network model and various device parameters. In one embodiment, processor 110 executes a learning algorithm including computing a squared error between observed power and projected power. Based on the learning algorithm executed by processor 110, system 100 can adjust various device parameters to minimize the computed squared error. System 100 can store the "learned" device parameters for future memory power load projections.

In one embodiment, processor 110 represents a central processing unit (CPU) of a computing device. Processor 110 can alternatively be another processing device of a computing/electronic device in which the power management described is incorporated. Processor 110 controls the operation of a computing device of which system 100 is a part. In one embodiment, memory controller 112 is integrated onto processor 110, such as an SOC (system on a chip). Memory controller 112 can alternatively be a separate chip from processor 110.

Memory controller 112 interfaces with memory subsystem 120 via memory bus 122. Memory bus 122 represents various signal lines, drivers, and other components to exchange commands and data with memory subsystem 120. In one embodiment, memory controller 112 generates known traffic pattern(s) to send to memory subsystem 120 to train system 100 on the power performance behavior of memory subsystem 120. Memory controller 112 also controls the memory access traffic associated with active operation of system 100, where processor 110 executes and memory subsystem 120 stores and provides data to support the execution of processor 110.

Power source 130 can be, for example, a voltage regulator that specifically provides power to memory subsystem 120. Power source 130 includes current sensing components 132, which allow power source 130 to monitor the current generated to attached devices. Current sensing components 132 are typically included in power source 130 for internal purposes, to monitor its own performance. However, in one embodiment, processor 110 can access the information from power source 130 over an access bus that interfaces with the power source. Thus, power source 130 can provide current information 134 to processor 110 or other processing logic that performs computations for management of memory subsystem power.

By monitoring the current usage of known traffic patterns, each individual system can learn or train its own best fit for the memory subsystem interface parameters. The system can learn its own behaviors, and device parameters do not need to be communicated in advance. In contrast to the traditional use of static memory device "weight" tables, the monitoring allows dynamic adjustment to system operation. Weight tables are typically preloaded into BIOS (basic input/output system), and thus only change with changes to BIOS. Thus, weight tables are likely to cause RAPL (running average power limit) to prematurely recommend throttling to avoid an over-temperature condition, which can adversely impact performance. In certain cases, the static table may cause RAPL to under-predict power if a significant outlier memory device is installed in the system, resulting in over-heating condition or even failure of the system.

In one embodiment, system 100 is an SOC, which includes one or more system functions 142 integrated onto a common chip with processor 110. In one embodiment, system 100 is a system in package (SIP) or other multichip package (MCP) that incorporates processor 110, one or more system function circuits 142 (which can each be identified as a separate subsystem), and one or more memory devices (represented by memory subsystem 120). When system 100 is implemented as an SOC or SIP, there is added benefit in that processor 110 can identify different current profiles for various devices in the SOC or SIP. For example, an integrated graphics processor or other device can also generate access to memory subsystem 120, which will result in different power usage behavior by the system. By characterizing the power usage of system 100, including specifically identifying the power usage with respect to different memory access sources (e.g., different SOC devices or circuits), system 100 can perform better load balancing based on the specific knowledge of how traffic affects the current and heating of the system.

It will be understood that system 100 can support different modes of operation with respect to monitoring power usage performance. In one mode, system 100 trains the system to learn what parameters to use with the system. In one embodiment, system 100 trains the memory access parameters during initialization of the memory subsystem (e.g., during start-up or reset of the system). For training, memory controller 112 can generate known memory access patterns or patterns of access to exchange with memory subsystem 120. Current sensing 132 can monitor the current drawn by memory subsystem 120 in response to the known patterns. The system can then store the characterizations or learned parameter behavior for subsequent use in active operation of the system.

In the second mode, system 100 is active, and components of system 100 generate memory access transactions to interface with memory subsystem 120. Processor 110 can then use the training or characterization information to generate predictions of power use. In active operation, processor 110 can compute a predicted power usage based on the characterized or learned parameters, and compare the prediction to monitored actual usage, as indicated by current sensing 132. Processor 110 can use the active operation monitoring to improve the predictions and parameters used to operate the interface with memory subsystem 120.

In one embodiment, processor 110 adjusts a memory access parameter based on the training information. In one embodiment, processor 110 adjusts a frequency parameter that controls a frequency associated with the memory access. In one embodiment, processor 110 adjusts a voltage parameter associated with the memory access. In one embodiment, processor 110 adjusts bandwidth of the memory access. In one embodiment, adjusting the bandwidth can mean adjusting load balancing among different memory access sources.

Figure 2:
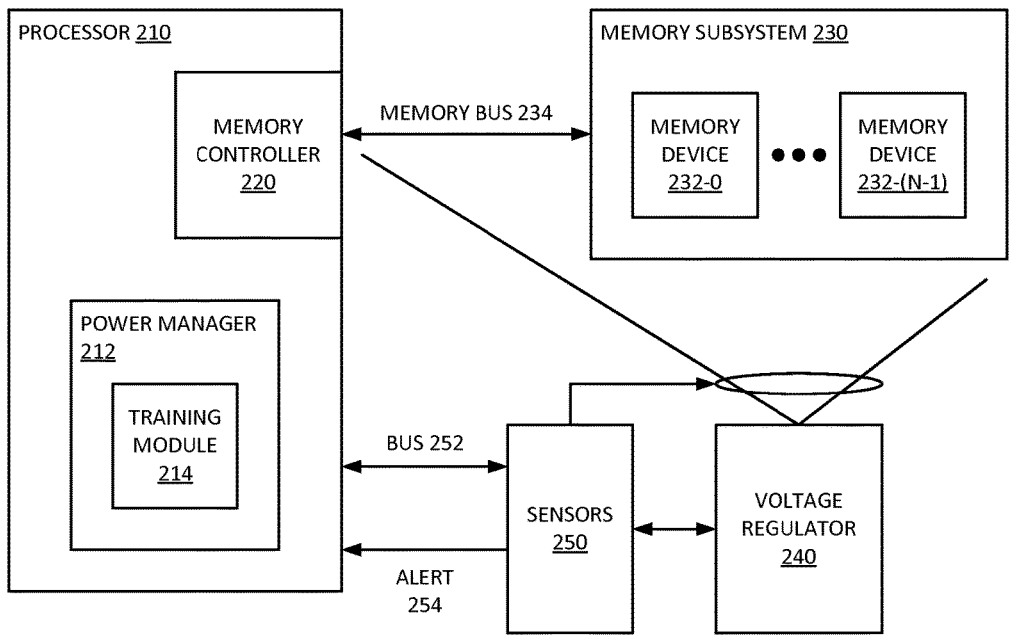
FIG. 2 is a block diagram of an embodiment of a system having a power source with sensors that dynamically measure the power usage of the memory subsystem.

FIG. 2 is a block diagram of an embodiment of a system having a power source with sensors that dynamically measure the power usage of the memory subsystem. System 200 can be one example of a system in accordance with an embodiment of system 100 of FIG. 1. System 200 is illustrated as including memory subsystem 230. It will be understood that instead of a memory subsystem, a different subsystem could be used. For example, specific parameters for interfacing with another subsystem can be dynamically monitored and adjusted based on current readings for the subsystem. Thus, the memory subsystem should be understood as a non-limiting example.

Memory subsystem 230 is illustrated as including N memory devices 232. It will be understood that depending on the configuration of system 200, memory subsystem 230 could be a single chip, and could thus be referred as a memory device. Memory controller 220 represents a memory controller circuit or equivalent circuit that interfaces with the observed device, which is memory subsystem 230 or another subsystem (not shown). Memory bus 234 represents the physical and logical interface between memory controller 220 and memory subsystem 230.

Memory controller 220 sends known traffic patterns across memory channel 234. These known traffic patterns cause memory subsystem 230 to load the power rail supplied by voltage regulator (VR) 240. In one embodiment, VR 240 includes sensors 250, which can be implemented in connection with a programmable microcontroller in the VR (e.g., such as a PMIC controller). Sensors 250 sense the VR power generated as a function of the traffic patterns sent by memory controller 220. In one embodiment, sensors 250 communicate the power observed to processor 210. In one embodiment, the observed power is communicated to power manager 212, which represents a management system in accordance with any embodiment described.

In one embodiment, power manager 212 includes one or more algorithms, such as learning algorithms, that processor 210 executes. Thus, processor 210 via power manager 212 can execute parameter learning or training, and adjust memory access parameters in a power equation to more precisely manage memory access performance. For example, if power manager 212 computes a squared error computation (for example, refer to the description of FIG. 3), the model will more closely match the actual performance of the memory subsystem, allowing tighter control of the performance parameters.

It is expected that after multiple traffic patterns, the parameters of memory controller 220 associated with accessing memory subsystem 230 will resolve to the best match for the system. Thus, memory controller 220 will arrive at optimized settings. Finding a best match can be referred to as "optimizing," but it will be understood that reference to optimizing typically refers to a subjective optimum, and does not necessarily suggest that a better setting could not be performed, or that further increased performance could not be achieved.

It will be understood that system 200 provides a closed loop approach to memory subsystem power management, as opposed to the traditional open loop assessment of the system. The open loop approach is based on out of system testing and worst case estimates. The described closed loop approach is based on feedback from sensors 250 in response to traffic memory controller 220 sends on memory bus 234. Based on the training, power manager 212 can manage the active or runtime operation of memory access to memory subsystem 230.

In one embodiment, power manager 212 includes training module 214, which triggers the training of the memory access parameters in system 200. Training module 214 represents the functionality that generates the power model to predict the power performance. As stated above, memory power is a function of memory configuration, memory bus traffic, and memory device interface parameters. The interface parameters can be referred to as I/O (input/output) parameters.

The platform memory configuration (e.g., capacity, speed, type, ranks, channels, other configuration) is established at system boot. Thus, the memory configuration is knowable to power manager 212. The memory channel traffic is controllable, seeing that memory controller 220 drives the memory traffic. Memory controller 220 can determine what traffic to send when to memory subsystem 230.

As described, the memory device parameters or the memory access parameters are learnable. The variation of the memory devices is the greatest uncertainty to projecting memory power on device platforms. In one embodiment, power manager 212 trains the power management of the memory subsystem by modeling current loading as a function of various device parameters. The device parameter current loading is commonly identified in industry as various "IDDs," referring to the current drawn under certain conditions. IDDs vary by vendor, manufacturing process generation, temperature, lots, and other variables. In one embodiment, power manager 212 models memory subsystem power as a superposition of current load profiles (IDDs) and their active time. The "percent active time" is roughly the percentage of time in a particular state.

The memory access parameters are learnable, which allows power manager 212 to predict power usage, and actual power usage is observable via sensors 250. System memory power is the sum of power used by memory devices 232, and the power used by memory controller 220. Sensors 250 can directly sense voltage and current from VR 240, and communicate the current observed to processor 210 via bus 252. Bus 252 can be, for example, a serial voltage identification (SVID) bus, an inter-I/C (I2C) interface, or other interface that enables communication from sensors 250 to processor 210. In one embodiment, sensors 250 can also provide alert over alert line 254. Alerts can include, for example, an indication of an over-current or over-temperature condition. Power manager 212 can determine how to model the power based on the information on bus 252, but alerts on interface 254 indicate a need to restrict operation on memory bus 234. Power manager 212 can include an algorithm that adjusts weights internal to the power manager to use in controlling how signals are sent to memory subsystem 230.

Figure 3:
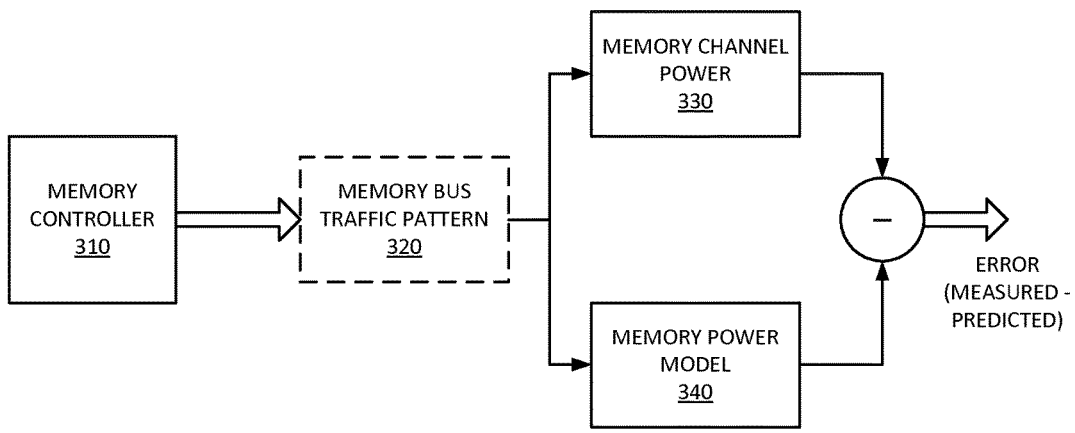
FIG. 3 is a block diagram of an embodiment of a representation of computing memory subsystem power usage.

FIG. 3 is a block diagram of an embodiment of a computation of memory subsystem power usage. The representation can be an overview of operations in system 100 of FIG. 1 or system 200 of FIG. 200. In one embodiment, a power management system computes a model of power usage for a memory subsystem based on training with known traffic patterns. In active operation of the memory subsystem, memory controller 310 generates actual memory access traffic, instead of known patterns to test power performance. Memory bus traffic pattern 320 represents the active traffic placed on the memory bus that interfaces the memory controller to a memory device/memory subsystem.

A current sensing component measures the current of the memory subsystem drawn for the traffic pattern. The current sensing component provides data to a power management system that enables the power management system to compute memory channel power 330 (which could be computed by the current sensing component). The power management system can compute memory model power 340 based on previous observations of the current drawn by the memory subsystem. Based on memory bus traffic pattern 320, the power management system can predict the power expected to be used, which is represented by memory power model 340.

In one embodiment, the power management system computes a difference between the predicted power (340) and the observed or measured power (330), generating an error measurement. The management system can use the error to adjust memory power model 340 for subsequent transactions or traffic patterns 320. The model can predict how the system should set the memory access parameters for access to the memory subsystem, to improve power performance.

Figure 4:
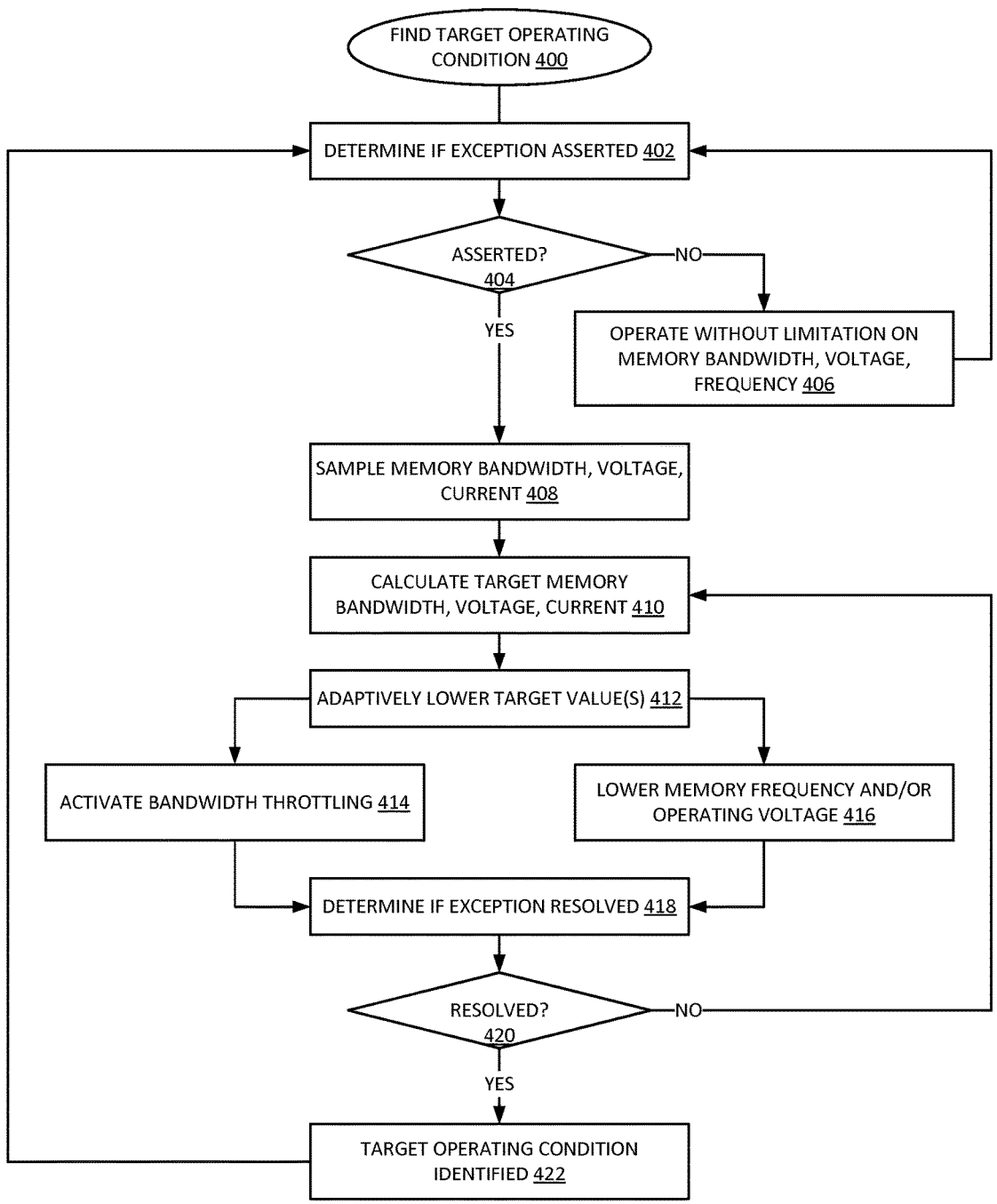
FIG. 4 is a flow diagram of an embodiment of a process for finding a target operating condition of memory subsystem power performance.

FIG. 4 is a flow diagram of an embodiment of a process for finding a target operating condition of memory subsystem power performance. Process 400 is one example of a process that can be executed by a power management component, such as power manager 212 of FIG. 2. In one embodiment, the power management controls the power to a memory subsystem or other subsystem of an SOC, allowing traffic exchange with the subsystem without restrictions unless a condition is detected that indicates a change should be made. For example, the power management can generate a power model, and test requested operations with the model to verify that the runtime operation is within expected conditions.

The power management can monitor for exception to the expected conditions. Thus, the power management determines if an exception is asserted, 402. The exception can be detected by a current sensor, such as detecting an over-current condition. The exception can also be a condition of variance from the expected model generated by the power management. If there is no exception asserted, 404 NO branch, the power management can continue to operation without limitation on bandwidth, voltage, and/or frequency parameters associated with the interface, 406, and can then continue to monitor for exception conditions, 402.

If there is an exception asserted, 404 YES branch, the power management can sample bandwidth, voltage, and/or current values as measured by a sensor, such as a PMIC, 408. In one embodiment, the power management calculates a target bandwidth, voltage, and/or current setting for the interface with the subsystem, 410. The power management makes the calculations based on settings for the interface and the measured/sampled values. In one embodiment, the power management adaptively lowers a target value based on the calculation, 412. Adaptively lowering the setting indicates that the value can be lowered and compared again to the target in an iterative way to find the best setting.

The power management can adjust any combination of bandwidth, voltage, and/or current. Thus, in one embodiment, the power management activates bandwidth throttling to lower a target bandwidth, 414. In one embodiment, the power management lowers a frequency and/or operating voltage associated with the monitored subsystem, 416. After making an restrictive adjustment on the interface, the power management can determine if the exception is resolved, 418. If the exception is not resolved, 420 NO branch, the power management again calculates a new target value and iterates, 410. If the exception is resolved, 420 YES branch, the target operating condition is identified, 422, and the system can resume normal operation, 402.

In one embodiment, the following pseudocode can indicate operations that can implement a state machine (SM) to execute a process in accordance with an embodiment of process 400. Comments follow the lines of the pseudocode.

```
for(exception==1) {
        target_BW = fn1(last_BW, last_frequency, last_voltage, control_parameters);
        /* target_BW is the bandwidth target, computed as a function of known variables;
control_parameters are tunable variables such as step size, magnitude of change, etc. */
        target_frequency = fn2(last_BW, target_BW, last_frequency, last_voltage,
control_parameters);
        /* target_frequency is a function of the known variables and target_BW */
        target_voltage = fn3(last_frequency, target_frequency, last_voltage,
control_parameters);
        /* target_frequency is a function of the known variables, target_BW, and
target_frequency */
        last_BW = target_BW;
        last_frequency = target_frequency;
        last_voltage = target_voltage;
        write target_BW to memory controller SM;
        /* the process writes target_BW to a state machine of a controller that controls the
interface */
        activate SM to change to target_frequency and target_voltage;
        /* the state machine can implement the changes to the parameters to the target values
calculated */
}
```

Figure 5:
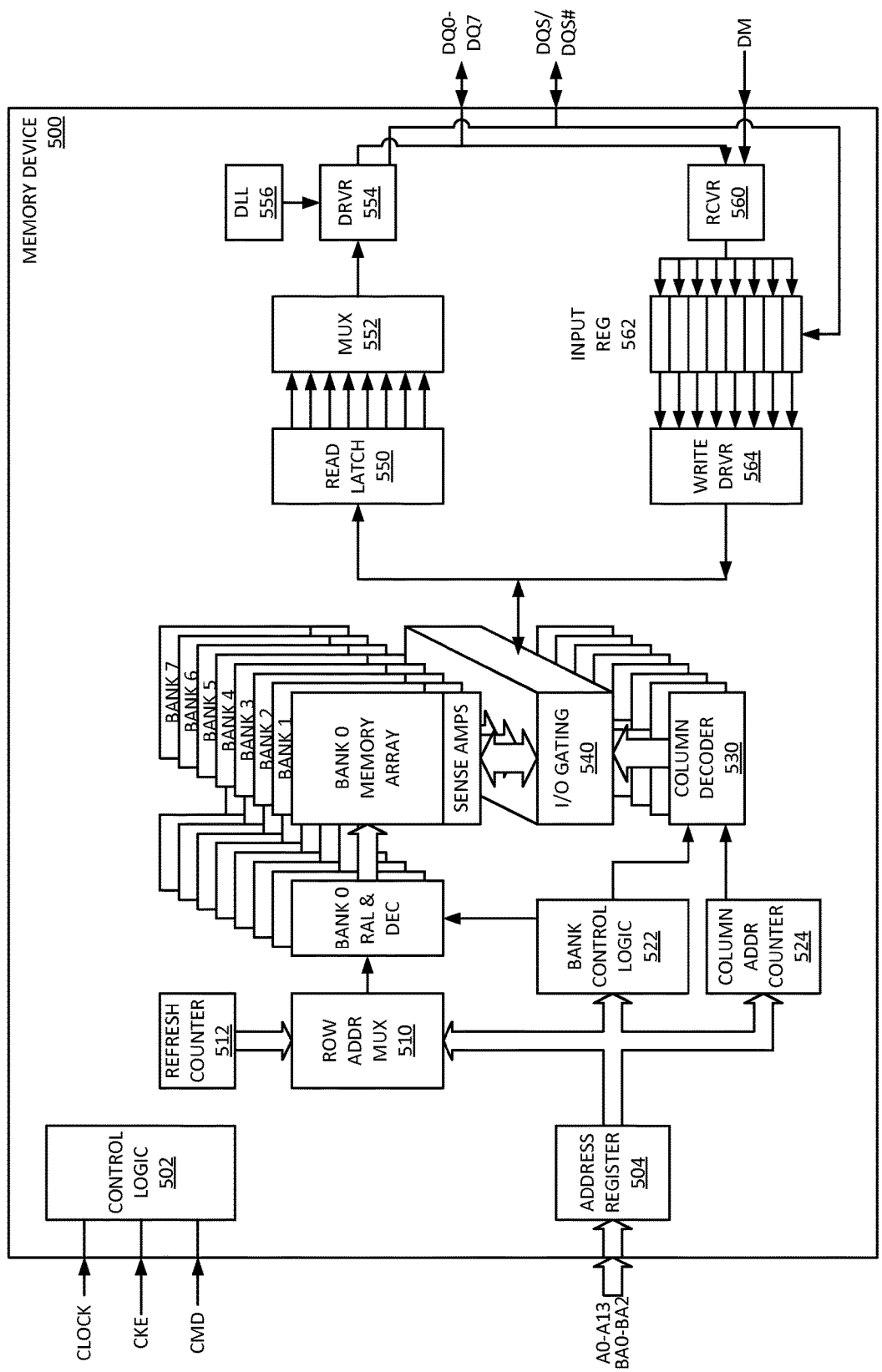
FIG. 5 is a block diagram of an embodiment of a memory device for which an operating condition of power performance is measured.

FIG. 5 is a block diagram of an embodiment of a memory device for which an operating condition of power performance is measured. Memory device 500 represents one example of a memory device in accordance with any system described herein that monitors a memory subsystem/device interface. Power management can profile or characterize the operation of memory device 500 to determine how to manage the interface. In one embodiment, memory device 500 is a DRAM with the following current profile for modeling: IDD0 represents DRAM row activation current; IDD2/3 represent background current; IDD4R/W represent currents for read and write, respectively; IDD5 represents refresh current; and, IDD6 represents self-refresh or standby current. The power profile for memory device 500 can be modeled as: memory_power=P(Activate)+P(Write)+P(Read)+P(Refresh)+P(Data)+P(Termination)+P(Other)+P(Memory Controller Circuitry). The function P( ) represents a power function for each parameter, and can account for a percentage of time the device executes in the particular state or condition. The power function can be computed with respect to the current profiles and the timing. For example, P(Refresh) could be stated as follows: P(Refresh)=((IDD5-IDD3)×VDD×(tRFC_MIN/tREFI)), where VDD is the operating voltage, and tRFC_MIN and tREFI are parameters that indicate how often the device enters refresh and how long it will stay in refresh. It will be understood that each operation triggers different functional components of memory device 500. Thus, each operation can result in a different current draw, depending on what is required to perform the operation.

Control logic 502 receives clock, clock enable, and command signals, and controls the operation of the memory device in relation to those signals. Address register 504 receives row address and bank address signals to identify the portion of memory that is to be affected by a particular command. Address register 504 distributes the address information to row address multiplexer 510, bank control logic 522, and column address counter 524. Row address mux 510 takes the row address information and a refresh counter as input, and controls the row address latch (RAL) and decoder for each bank (Bank 0-Bank7). Bank control logic 522 selects which bank will be selected for the memory access operation (command) received. Column address counter 524 generates a signal to select the column for the operation.

The RAL and decoder for each bank select an address in a bank, and the sense amplifiers can be activated, depending on the operation. I/O gating 540 can place data into the sense amplifiers for a write operation, and can read the data out for a read operation. Column decoder 530 receives the bank control logic selection and the column address counter selection and makes a column selection for I/O gating 540.

Read latch 550 is coupled to receive data bits from I/O gating 540 for a read operation. Read latch 550 feeds the data into mux 552, which can select a single byte of the data to pass to driver 554, which will place the data on the signal lines DQ0-DQ7. The timing for driving the data bus is provided by DLL 556. Driver 554 can drive the data strobe lines based on the timing. Receiver 560 receives write data from the data bus, and inputs it into input register or input buffer 562. Receiver 560 also receives a data mask signal (DM) that can indicate when the memory device should perform a read operation. Input register 562 samples the data in accordance with the data strobe line, and can latch the data to write driver 564, which provides the data to I/O gating 540.

Figure 6A:
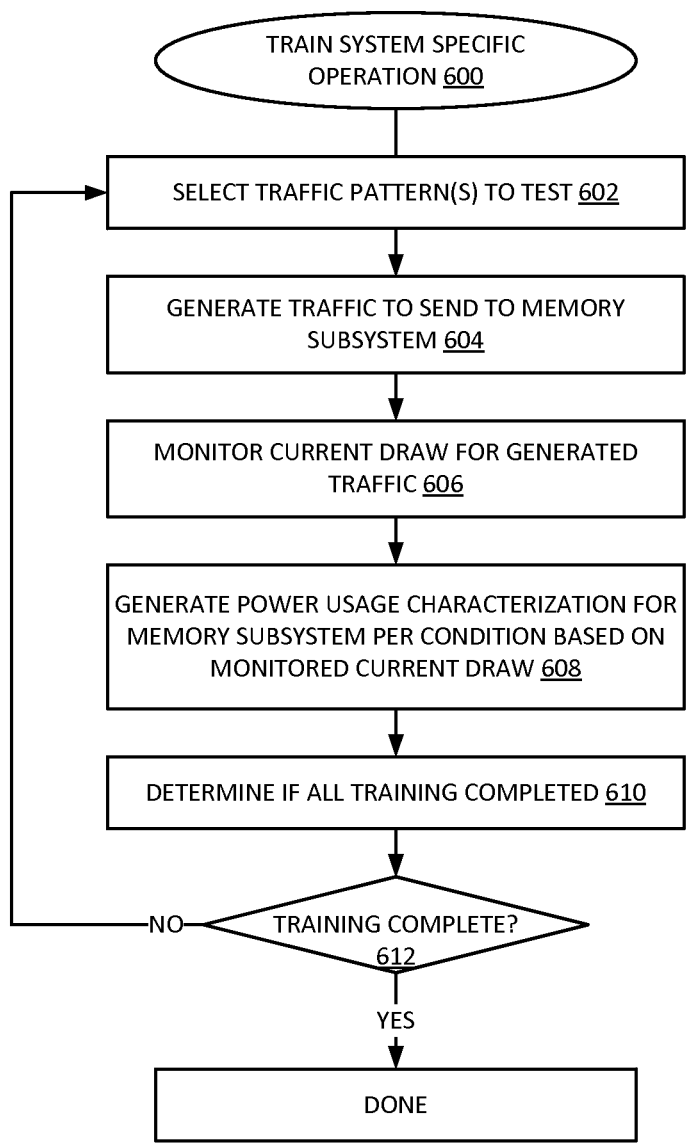
FIG. 6A is a flow diagram of an embodiment of a process for training system specific operation with respect to memory subsystem power performance.

FIG. 6A is a flow diagram of an embodiment of a process for training system specific operation with respect to memory subsystem power performance. Process 600 can be executed by power management to model power performance of a monitored subsystem, such as a memory subsystem. In one embodiment, a memory controller selects traffic pattern(s) to test, 602. The memory controller generates traffic in accordance with the selected traffic pattern(s) to send to memory subsystem, 604. A current sensor monitors current draw for the generated traffic, 606. As seen with respect to memory device 500 of FIG. 5, different operations and different traffic patterns will trigger different components of the memory subsystem, and thus will result in different current draw. By monitoring the current draw of different traffic patterns, the power management can generate an accurate model of the power usage for the memory subsystem.

Thus, power management generates a power usage characterization for the memory subsystem per condition or per traffic pattern based on the current draw monitored for each different pattern or condition of operation of the devices, 608. The power management will use the characterization for monitoring the runtime operation of the memory subsystem. The memory controller determines if all training complete, 610. For example, the power management can indicate whether the memory controller should generate other test patterns. If the training is not complete, 612 NO branch, the memory controller will select another traffic pattern to train the interface, 602. If the training is complete, 612 YES branch, then the process can finish.

Figure 6B:
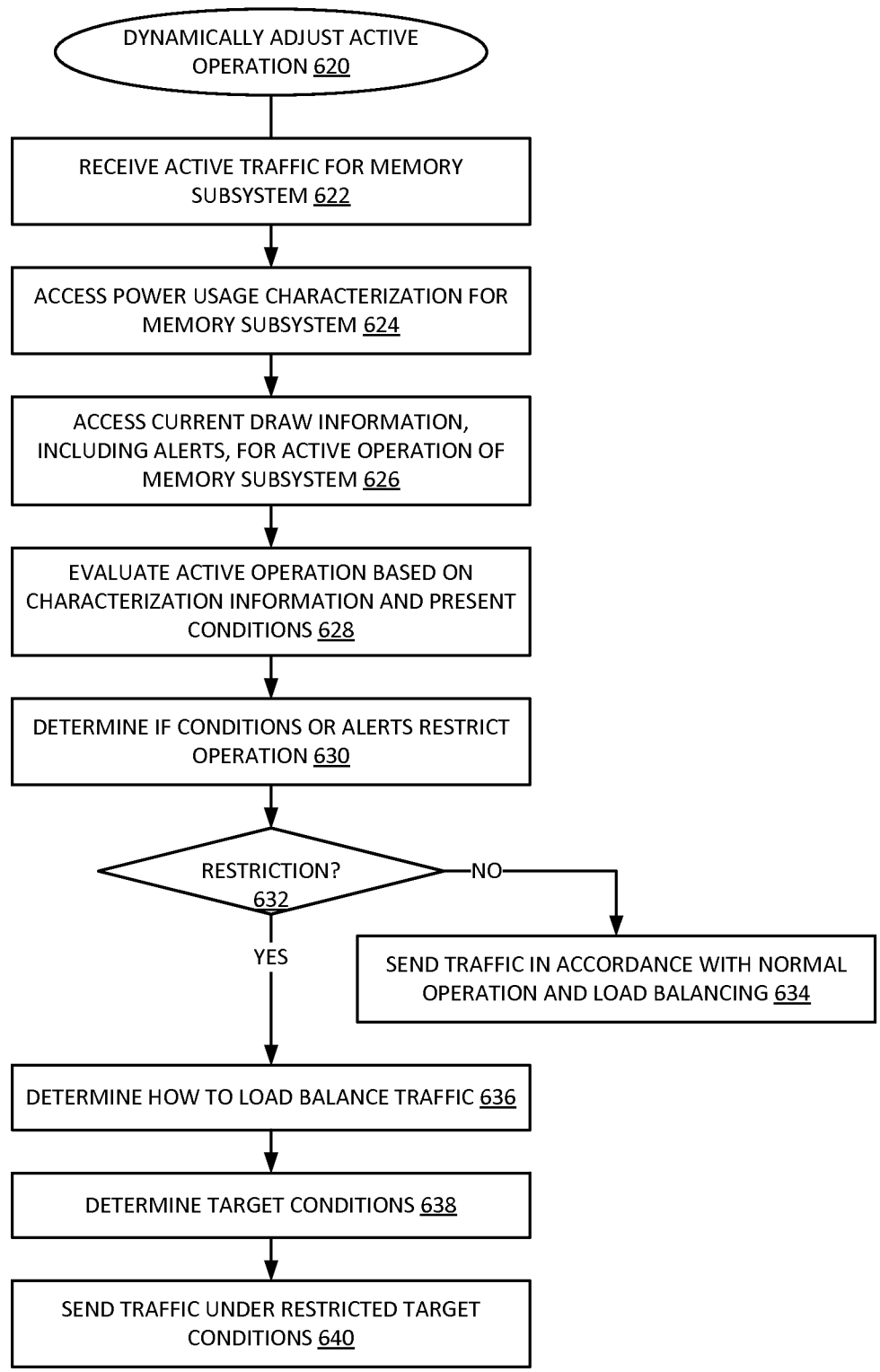
FIG. 6B is a flow diagram of an embodiment of a process for dynamically adjusting active operation of a system with respect to memory subsystem power performance.

FIG. 6B is a flow diagram of an embodiment of a process for dynamically adjusting active operation of a system with respect to memory subsystem power performance. Process 620 represents a process that can be executed by a power management system in accordance with any embodiment described. A memory controller receives active traffic for an associated memory subsystem, 622. The memory subsystem is the observed system for which the power management controls power usage. The memory controller sends the traffic over a memory bus to the memory subsystem.

In one embodiment, power management accesses specific power usage characterization for memory subsystem, 624. The characterizations can be of the form of power models for different runtime operating conditions of the memory subsystem. A current sensor monitors the power drawn by the memory subsystem, including the memory controller, during the active operation. The power management can access the current draw information from the sensor, including alerts, for active operation of the memory subsystem, 626. The alerts can include information other than the current draw values, such as indications of an over-current condition.

In one embodiment, the power management evaluates active operation for the memory subsystem based on the characterization information and present conditions as indicated by the current draw information, 628. Evaluation of the active operation can be a comparison of actual current drawn versus expected current draw. If there is a difference, the power management can determine that a change is needed in the operating conditions. Thus, the power management can determine if a condition or alert exists that would suggest restricting one or more operating parameters for access to the memory subsystem, 630.

If the power management determines there is no restriction needed, 632 NO branch, the memory controller can send the traffic in accordance with normal operation and load balancing, 634. If the power management determines there is a restriction needed, 632 YES branch, the power management can adjust one or more operating conditions to lower the power usage, or average the power usage over time. For example, in an SOC the power management can determine how to adjust load balancing on the traffic sent to the memory subsystem, 636. Different traffic sources can result in different power usage by the memory subsystem; thus, adjusting the load balancing can effect a change to average power usage by the memory subsystem. In one embodiment, the power management determines to adjust a target condition or a target operating parameter, 638. Adjusting a target condition can be performed in accordance with process 400 of FIG. 4. After making whatever adjustments are determined necessary by the power management, the memory controller can send traffic under the restricted target condition(s), 640.

Figure 7:
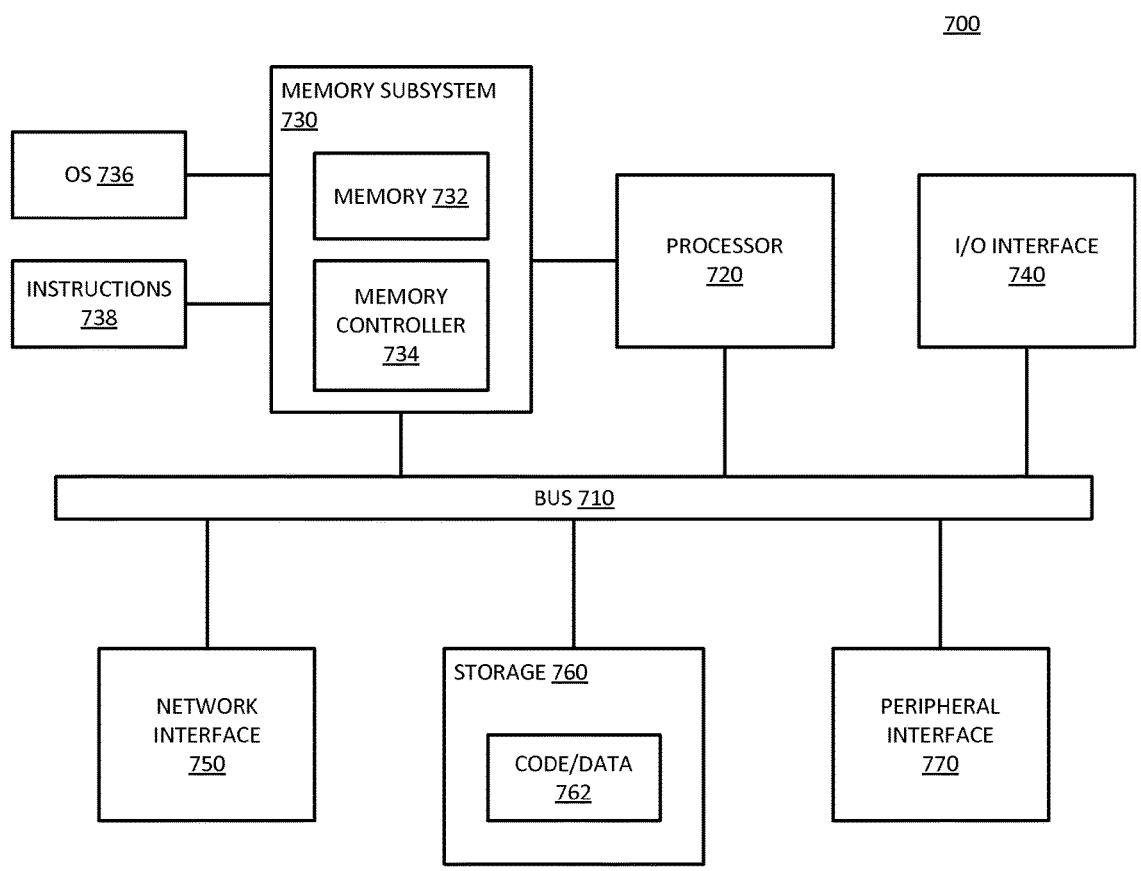
FIG. 7 is a block diagram of an embodiment of a computing system in which dynamic memory power management can be implemented.

FIG. 7 is a block diagram of an embodiment of a computing system in which dynamic memory power management can be implemented. System 700 represents a computing device in accordance with any embodiment described herein, and can be a laptop computer, a desktop computer, a server, a gaming or entertainment control system, a scanner, copier, printer, routing or switching device, or other electronic device. System 700 includes processor 720, which provides processing, operation management, and execution of instructions for system 700. Processor 720 can include any type of microprocessor, central processing unit (CPU), processing core, or other processing hardware to provide processing for system 700. Processor 720 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 730 represents the main memory of system 700, and provides temporary storage for code to be executed by processor 720, or data values to be used in executing a routine. Memory subsystem 730 can include one or more memory devices such as read-only memory (ROM), flash memory, one or more varieties of random access memory (RAM), or other memory devices, or a combination of such devices. Memory subsystem 730 stores and hosts, among other things, operating system (OS) 736 to provide a software platform for execution of instructions in system 700. Additionally, other instructions 738 are stored and executed from memory subsystem 730 to provide the logic and the processing of system 700. OS 736 and instructions 738 are executed by processor 720. Memory subsystem 730 includes memory device 732 where it stores data, instructions, programs, or other items. In one embodiment, memory subsystem includes memory controller 734, which is a memory controller to generate and issue commands to memory device 732. It will be understood that memory controller 734 could be a physical part of processor 720.

Processor 720 and memory subsystem 730 are coupled to bus/bus system 710. Bus 710 is an abstraction that represents any one or more separate physical buses, communication lines/interfaces, and/or point-to-point connections, connected by appropriate bridges, adapters, and/or controllers. Therefore, bus 710 can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 710 can also correspond to interfaces in network interface 750.

System 700 also includes one or more input/output (I/O) interface(s) 740, network interface 750, one or more internal mass storage device(s) 760, and peripheral interface 770 coupled to bus 710. I/O interface 740 can include one or more interface components through which a user interacts with system 700 (e.g., video, audio, and/or alphanumeric interfacing). Network interface 750 provides system 700 the ability to communicate with remote devices (e.g., servers, other computing devices) over one or more networks. Network interface 750 can include an Ethernet adapter, wireless interconnection components, USB (universal serial bus), or other wired or wireless standards-based or proprietary interfaces.

Storage 760 can be or include any conventional medium for storing large amounts of data in a nonvolatile manner, such as one or more magnetic, solid state, or optical based disks, or a combination. Storage 760 holds code or instructions and data 762 in a persistent state (i.e., the value is retained despite interruption of power to system 700). Storage 760 can be generically considered to be a "memory," although memory 730 is the executing or operating memory to provide instructions to processor 720. Whereas storage 760 is nonvolatile, memory 730 can include volatile memory (i.e., the value or state of the data is indeterminate if power is interrupted to system 700).

Peripheral interface 770 can include any hardware interface not specifically mentioned above. Peripherals refer generally to devices that connect dependently to system 700. A dependent connection is one where system 700 provides the software and/or hardware platform on which operation executes, and with which a user interacts.

In one embodiment, processor 720 includes power management that controls power usage by memory subsystem 730. More particularly, the power management can monitor power usage by memory subsystem 730 via a current sensor in a voltage regulator that provides power to memory subsystem 730. Based on measured data and a model based on training data, the power management can adjust interface parameters between memory 732 and memory controller 734, including one or more of bandwidth, voltage, or frequency.

Figure 8:
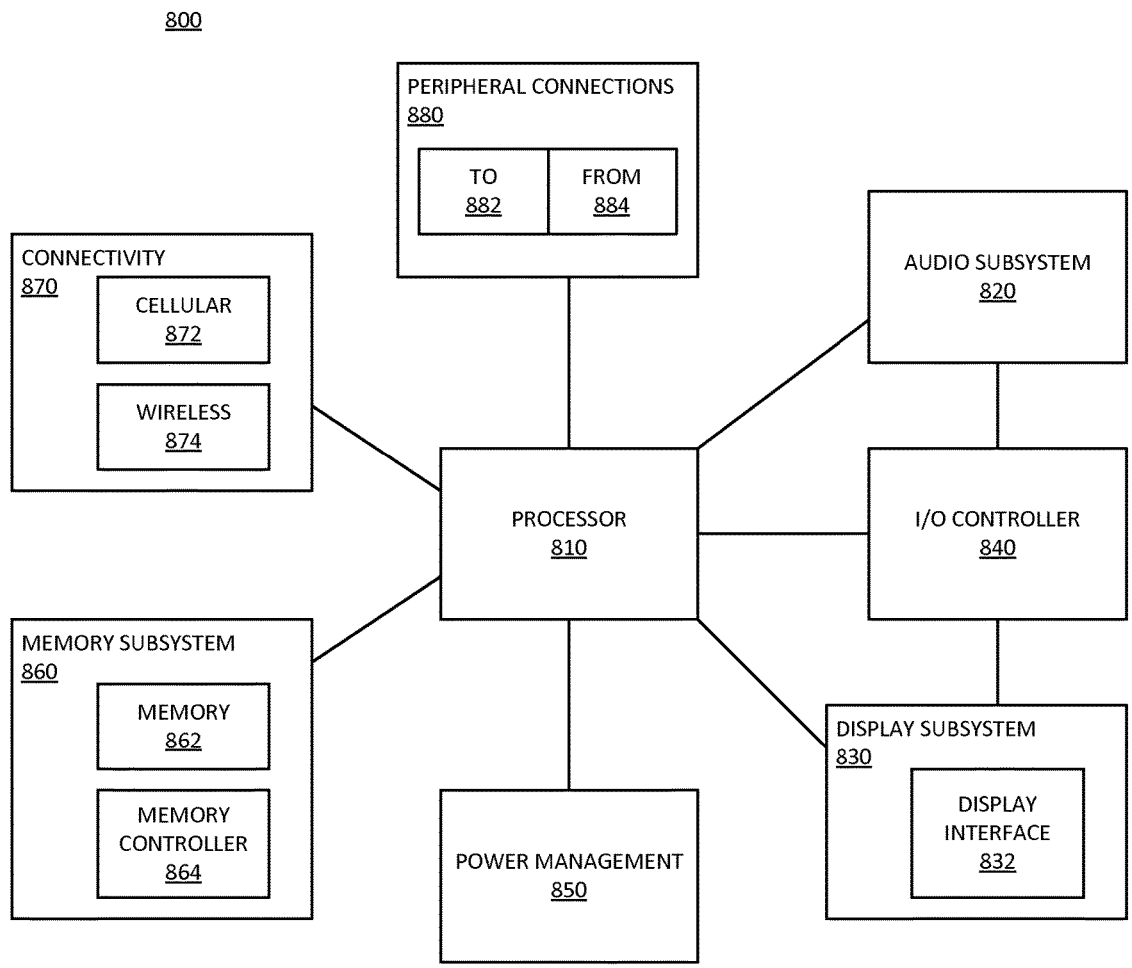
FIG. 8 is a block diagram of an embodiment of a mobile device in which dynamic memory power management can be implemented.

FIG. 8 is a block diagram of an embodiment of a mobile device in which dynamic memory power management can be implemented. Device 800 represents a mobile computing device, such as a computing tablet, a mobile phone or smartphone, a wireless-enabled e-reader, wearable computing device, or other mobile device. It will be understood that certain of the components are shown generally, and not all components of such a device are shown in device 800.

Device 800 includes processor 810, which performs the primary processing operations of device 800. Processor 810 can include one or more physical devices, such as microprocessors, application processors, microcontrollers, programmable logic devices, or other processing means. The processing operations performed by processor 810 include the execution of an operating platform or operating system on which applications and/or device functions are executed. The processing operations include operations related to I/O (input/output) with a human user or with other devices, operations related to power management, and/or operations related to connecting device 800 to another device. The processing operations can also include operations related to audio I/O and/or display I/O.

In one embodiment, device 800 includes audio subsystem 820, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 800, or connected to device 800. In one embodiment, a user interacts with device 800 by providing audio commands that are received and processed by processor 810.

Display subsystem 830 represents hardware (e.g., display devices) and software (e.g., drivers) components that provide a visual and/or tactile display for a user to interact with the computing device. Display subsystem 830 includes display interface 832, which includes the particular screen or hardware device used to provide a display to a user. In one embodiment, display interface 832 includes logic separate from processor 810 to perform at least some processing related to the display. In one embodiment, display subsystem 830 includes a touchscreen device that provides both output and input to a user.

I/O controller 840 represents hardware devices and software components related to interaction with a user. I/O controller 840 can operate to manage hardware that is part of audio subsystem 820 and/or display subsystem 830. Additionally, I/O controller 840 illustrates a connection point for additional devices that connect to device 800 through which a user might interact with the system. For example, devices that can be attached to device 800 might include microphone devices, speaker or stereo systems, video systems or other display device, keyboard or keypad devices, or other I/O devices for use with specific applications such as card readers or other devices.

As mentioned above, I/O controller 840 can interact with audio subsystem 820 and/or display subsystem 830. For example, input through a microphone or other audio device can provide input or commands for one or more applications or functions of device 800. Additionally, audio output can be provided instead of or in addition to display output. In another example, if display subsystem includes a touchscreen, the display device also acts as an input device, which can be at least partially managed by I/O controller 840. There can also be additional buttons or switches on device 800 to provide I/O functions managed by I/O controller 840.

In one embodiment, I/O controller 840 manages devices such as accelerometers, cameras, light sensors or other environmental sensors, gyroscopes, global positioning system (GPS), or other hardware that can be included in device 800. The input can be part of direct user interaction, as well as providing environmental input to the system to influence its operations (such as filtering for noise, adjusting displays for brightness detection, applying a flash for a camera, or other features). In one embodiment, device 800 includes power management 850 that manages battery power usage, charging of the battery, and features related to power saving operation.

Memory subsystem 860 includes memory device(s) 862 for storing information in device 800. Memory subsystem 860 can include nonvolatile (state does not change if power to the memory device is interrupted) and/or volatile (state is indeterminate if power to the memory device is interrupted) memory devices. Memory 860 can store application data, user data, music, photos, documents, or other data, as well as system data (whether long-term or temporary) related to the execution of the applications and functions of system 800. In one embodiment, memory subsystem 860 includes memory controller 864 (which could also be considered part of the control of system 800, and could potentially be considered part of processor 810). Memory controller 864 includes a scheduler to generate and issue commands to memory device 862.

Connectivity 870 includes hardware devices (e.g., wireless and/or wired connectors and communication hardware) and software components (e.g., drivers, protocol stacks) to enable device 800 to communicate with external devices. The external device could be separate devices, such as other computing devices, wireless access points or base stations, as well as peripherals such as headsets, printers, or other devices.

Connectivity 870 can include multiple different types of connectivity. To generalize, device 800 is illustrated with cellular connectivity 872 and wireless connectivity 874. Cellular connectivity 872 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 874 refers to wireless connectivity that is not cellular, and can include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 880 include hardware interfaces and connectors, as well as software components (e.g., drivers, protocol stacks) to make peripheral connections. It will be understood that device 800 could both be a peripheral device ("to" 882) to other computing devices, as well as have peripheral devices ("from" 884) connected to it. Device 800 commonly has a "docking" connector to connect to other computing devices for purposes such as managing (e.g., downloading and/or uploading, changing, synchronizing) content on device 800. Additionally, a docking connector can allow device 800 to connect to certain peripherals that allow device 800 to control content output, for example, to audiovisual or other systems.

In addition to a proprietary docking connector or other proprietary connection hardware, device 800 can make peripheral connections 880 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In one embodiment, power management 850 controls power usage by memory subsystem 860. More particularly, power management 850 can monitor power usage by memory subsystem 860 via a current sensor in a voltage regulator that provides power to memory subsystem 860. Based on measured data and a model based on training data, the power management can adjust interface parameters between memory 862 and memory controller 864, including one or more of bandwidth, voltage, or frequency.

In one aspect, a method for monitoring memory power usage includes: monitoring a current draw from a memory device in response to the memory device receiving a known traffic pattern; generating a power usage characterization for the memory device based on the monitored current draw for the known traffic pattern; and adjusting a memory access performance parameter based on the power usage characterization.

In one embodiment, monitoring comprises receiving sensor input from current sensors in a voltage regulator that provides power to the memory device. In one embodiment, the memory device is part of a memory subsystem, and wherein the monitoring, the generating, and the adjusting are performed relative to the memory subsystem. In one embodiment, the memory device is part of a system-on-a-chip (SOC) having multiple different subsystems, and wherein generating the power usage characterization for the memory device comprises generating the power usage characterization for multiple different traffic patterns including traffic from different subsystems of the SOC. In one embodiment, adjusting the memory access performance parameter comprises load balancing among the different subsystems based on different power usage characterizations for the different traffic patterns including traffic from the different subsystems. In one embodiment, the method further includes monitoring current draw for the memory device for runtime memory access traffic; wherein adjusting the memory access performance parameter comprises throttling bandwidth of the memory access traffic sent to the memory device based on monitoring the current draw for runtime memory access traffic. In one embodiment, the method further includes monitoring current draw for the memory device for runtime memory access traffic; wherein adjusting the memory access performance parameter further comprises adjusting one or more of an operating voltage or an operating frequency of a memory access interface based on monitoring the current draw for runtime memory access traffic.

In one aspect, a power management system for monitoring memory power usage includes a current sensor to measure current usage information for a memory device; and a power manager executed on a processor device that controls a memory controller that provides a memory access interface to the memory device, the power manager to receive the current usage information from the current sensor, determine to adjust a memory access parameter for the memory access interface of the memory controller, the determining based on the current usage information received from the current sensor and based on a power usage characterization for the memory device that indicates power usage for the memory device for a known traffic pattern, and adjust the memory access performance parameter based on the current usage information and the power usage characterization.

In one embodiment, the current sensor comprises a current sensor in a power management integrated circuit of a voltage regulator that provides power to the memory device. In one embodiment, the memory device is part of a system-on-a-chip (SOC) having multiple different subsystems, and wherein generating the power usage characterization for the memory device comprises generating the power usage characterization for multiple different traffic patterns including traffic from different subsystems of the SOC. In one embodiment, the power manager is to adjust the memory access performance parameter by load balancing among the different subsystems based on different power usage characterizations for the different traffic patterns including traffic from the different subsystems. In one embodiment, the power manager is to further monitor current draw for the memory device for runtime memory access traffic; wherein the power manager is to adjust the memory access performance parameter by throttling bandwidth of the memory access traffic sent to the memory device based on monitoring the current draw for runtime memory access traffic. In one embodiment, the power manager is to further monitoring current draw for the memory device for runtime memory access traffic; wherein the power manager is to adjust the memory access performance parameter by adjusting one or more of an operating voltage or an operating frequency of a memory access interface based on monitoring the current draw for runtime memory access traffic.

In one aspect, an electronic device with power management to monitor memory power usage includes a memory device to store data; a host hardware platform including a processor device that controls a power management system, and a memory controller device that provides a memory access interface to the memory device, wherein the power management system includes; a current sensor to measure current usage information for the memory device; and a power manager executed on the processor device, the power manager to receive the current usage information from the current sensor, determine to adjust a memory access parameter for the memory access interface of the memory controller, the determining based on the current usage information received from the current sensor and based on a power usage characterization for the memory device that indicates power usage for the memory device for a known traffic pattern, and adjust the memory access performance parameter based on the current usage information and the power usage characterization; and a touchscreen display coupled to generate a display based on data accessed from the memory device.

In one embodiment, the current sensor comprises a current sensor in a power management integrated circuit of a voltage regulator that provides power to the memory device. In one embodiment, the memory device is part of a system-on-a-chip (SOC) having multiple different subsystems, and wherein generating the power usage characterization for the memory device comprises generating the power usage characterization for multiple different traffic patterns including traffic from different subsystems of the SOC. In one embodiment, the power manager is to adjust the memory access performance parameter by load balancing among the different subsystems based on different power usage characterizations for the different traffic patterns including traffic from the different subsystems. In one embodiment, the power manager is to further monitor current draw for the memory device for runtime memory access traffic; wherein the power manager is to adjust the memory access performance parameter by throttling bandwidth of the memory access traffic sent to the memory device based on monitoring the current draw for runtime memory access traffic. In one embodiment, the power manager is to further monitoring current draw for the memory device for runtime memory access traffic; wherein the power manager is to adjust the memory access performance parameter by adjusting one or more of an operating voltage or an operating frequency of a memory access interface based on monitoring the current draw for runtime memory access traffic.

In one aspect, an article of manufacture comprises a computer readable storage medium having content stored thereon, which when executed by a computing device performs operations for monitoring memory power usage, including: monitoring a current draw from a memory device in response to the memory device receiving a known traffic pattern; generating a power usage characterization for the memory device based on the monitored current draw for the known traffic pattern; and adjusting a memory access performance parameter based on the power usage characterization.

In one embodiment, the content for monitoring comprises content for receiving sensor input from current sensors in a voltage regulator that provides power to the memory device. In one embodiment, the memory device is part of a system-on-a-chip (SOC) having multiple different subsystems, and wherein the content for generating the power usage characterization for the memory device comprises content for generating the power usage characterization for multiple different traffic patterns including traffic from different subsystems of the SOC. In one embodiment, the content for adjusting the memory access performance parameter comprises content for load balancing among the different subsystems based on different power usage characterizations for the different traffic patterns including traffic from the different subsystems. In one embodiment, the article of manufacture further includes content for monitoring current draw for the memory device for runtime memory access traffic; wherein the content for adjusting the memory access performance parameter comprises content for throttling bandwidth of the memory access traffic sent to the memory device based on monitoring the current draw for runtime memory access traffic. In one embodiment, the article of manufacture further includes content for monitoring current draw for the memory device for runtime memory access traffic; wherein the content for adjusting the memory access performance parameter further comprises content for adjusting one or more of an operating voltage or an operating frequency of a memory access interface based on monitoring the current draw for runtime memory access traffic.

In one aspect, an apparatus for monitoring memory power usage includes means for monitoring a current draw from a memory device in response to the memory device receiving a known traffic pattern; means for generating a power usage characterization for the memory device based on the monitored current draw for the known traffic pattern; and means for adjusting a memory access performance parameter based on the power usage characterization.

In one embodiment, the means for monitoring comprises means for receiving sensor input from current sensors in a voltage regulator that provides power to the memory device. In one embodiment, the memory device is part of a system-on-a-chip (SOC) having multiple different subsystems, and wherein the means for generating the power usage characterization for the memory device comprises means for generating the power usage characterization for multiple different traffic patterns including traffic from different subsystems of the SOC. In one embodiment, the means for adjusting the memory access performance parameter comprises means for load balancing among the different subsystems based on different power usage characterizations for the different traffic patterns including traffic from the different subsystems. In one embodiment, the apparatus further includes means for monitoring current draw for the memory device for runtime memory access traffic; wherein the means for adjusting the memory access performance parameter comprises means for throttling bandwidth of the memory access traffic sent to the memory device based on monitoring the current draw for runtime memory access traffic. In one embodiment, the apparatus further includes means for monitoring current draw for the memory device for runtime memory access traffic; wherein the means for adjusting the memory access performance parameter further comprises means for adjusting one or more of an operating voltage or an operating frequency of a memory access interface based on monitoring the current draw for runtime memory access traffic.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
monitoring a current draw from a memory device in response to the memory device receiving one or more known traffic patterns, including monitoring the current draw based on memory access from different sources in a processing system that includes the memory device, the different sources including a central processor and a graphics processor;
wherein monitoring comprises receiving sensor input from current sensors in a voltage regulator that provides power to the memory device,
generating a power usage characterization for the memory device based on the monitored current draw for the known traffic patterns, the power usage characterization identifying power usage with respect to the different sources of memory access; based on the power usage characterization, generating a power estimate to identify estimated power usage with respect to the different sources of memory access including for the central processor and the graphics processor; and
performing load balancing among the different sources of memory access in the processing system based on a difference detected between the power estimate and actual power usage of the memory device, the load balancing including: in response to detecting the current draw from the memory device is higher than or equal to a threshold, lowering bandwidth for memory accesses from the central processor or the graphics processor based on the power usage characterization that identifies power usage with respect to the different sources of memory access.

2. The method of claim 1, wherein the memory device is part of a memory subsystem, and wherein the monitoring, the generating, and the adjusting are performed relative to the memory subsystem.

3. The method of claim 1, wherein the memory device is part of a system-on-a-chip (SOC) including the different sources of memory access, and wherein generating the power usage characterization for the memory device comprises generating the power usage characterization for multiple different traffic patterns including traffic from the different sources of memory access of the SOC.

4. The method of claim 3, wherein load balancing among the different sources of memory access is based on different power usage characterizations for the different traffic patterns including the memory access traffic to the memory device from the different sources of memory access of the SOC.

5. The method of claim 1, further comprising: monitoring current draw for the memory device for runtime memory access traffic; and throttling bandwidth of the memory access traffic sent to the memory device based on monitoring the current draw for the runtime memory access traffic.

6. The method of claim 1, further comprising: monitoring current draw for the memory device for runtime memory access traffic; and adjusting one or more of an operating voltage or an operating frequency of a memory access interface based on monitoring the current draw for the runtime memory access traffic.

7. The method of claim 1, wherein: monitoring the current draw from the memory device is based on memory access from the different sources including a central processor and a graphics processor; and wherein load balancing comprises load balancing among the different sources, including the central processor and the graphics processor.

8. A power management system, comprising:
a current sensor to generate current usage information for a memory device based on a measurement of current for the memory device in active operation and performing monitoring of power usage pattern of known traffic,
wherein monitoring comprises receiving sensor input from current sensors in a voltage regulator that provides power to the memory device;
and
a processor device configured to execute a power manager, the processor device to control a memory controller coupled to provide a memory access interface to the memory device, the power manager to receive the current usage information from the current sensor, determine to load balance among different sources of memory access in the processing system based on the current usage information received from the current sensor, a power usage characterization for the memory device, and
a power estimate to identify estimated power usage with respect to the different sources of memory access, including for the central processor and the graphics processor, and
perform load balancing among the different sources of memory access in the processing system based on a difference detected between the current usage information and the power estimate, including: in response to detection that the current for the memory device is higher than or equal to a threshold, to lower bandwidth for memory accesses from the central processor or the graphics processor based on the power usage characterization that identifies power usage with respect to the different sources of memory access.

9. The power management system of claim 8, wherein the current sensor comprises a current sensor in a power management integrated circuit of a voltage regulator coupled to provide power to the memory device.

10. The power management system of claim 8, wherein the memory device is part of a system-on-a-chip (SOC) having multiple different sources of memory access, and wherein the power manager is further to generate the power usage characterization for multiple different traffic patterns including memory access traffic from the different sources of memory access of the SOC.

11. The power management system of claim 10, wherein the power manager is to load balance among the different sources of memory access based on different power usage characterizations for the different traffic patterns.

12. The power management system of claim 8, wherein the power manager is to further: monitor current draw for the memory device for runtime memory access traffic; and wherein the power manager is to throttle bandwidth of the memory access traffic sent to the memory device based on monitoring the current draw for the runtime memory access traffic.

13. The power management system of claim 8, wherein the power manager is to further: monitor current draw for the memory device for runtime memory access traffic; and adjust one or more of an operating voltage or an operating frequency of a memory access interface based on monitoring the current draw for the runtime memory access traffic.

14. The power management system of claim 8, wherein: the current usage information for the memory device is based on memory access from the different sources in the processing system including a central processor and a graphics processor; and wherein the power manager is to load balance among the different sources, including the central processor and the graphics processor.

15. An electronic device comprising:
a memory device to store data; a host hardware platform including a processor device coupled to control a power management system and execute a power manager, and a memory controller device coupled to provide a memory access interface to the memory device, wherein the power management system includes a current sensor to generate current usage information for a memory device based on a measurement of current for the memory device in active operation and performing monitoring of power usage pattern of known traffic; wherein monitoring comprises receiving sensor input from current sensors in a voltage regulator that provides power to the memory device; and
a power manager to receive the current usage information from the current sensor, determine to load balance among different sources of memory access based on the current usage information received from the current sensor, a power usage characterization for the memory device, and
a power estimate to identify estimated power usage with respect to the different sources of memory access, including for the central processor and the graphics processor, and perform load balancing among the different sources of memory access based on a difference detected between the current usage information and the power estimate, including: in response to detection that the current for the memory device is higher than or equal to a threshold, to lower bandwidth for memory accesses from the central processor or the graphics processor based on the power usage characterization that identifies power usage with respect to the different sources of memory access; and a touchscreen display coupled to generate a display based on data accessed from the memory device.

16. The electronic device of claim 15, wherein the current sensor comprises a current sensor in a power management integrated circuit of a voltage regulator coupled to provide power to the memory device.

17. The electronic device of claim 15, wherein the memory device is part of a system-on-a-chip (SOC) having multiple different sources of memory access, and wherein the power manager is further to generate the power usage characterization for multiple different traffic patterns including traffic from different sources of memory access of the SOC.

18. The electronic device of claim 17, wherein the power manager is to load balance among the different sources of memory access based on different power usage characterizations for the different traffic.

19. The electronic device of claim 15, wherein the power manager is to further: monitor current draw for the memory device for runtime memory access traffic; wherein the power manager is to throttle bandwidth of the memory access traffic sent to the memory device based on monitoring the current draw for the runtime memory access traffic.

20. The electronic device of claim 15, wherein the power manager is to further: monitor current draw for the memory device for runtime memory access traffic; wherein the power manager is to adjust one or more of an operating voltage or an operating frequency of a memory access interface based on monitoring the current draw for the runtime memory access traffic.

21. The electronic device of claim 15, wherein: the current usage information for the memory device is based on memory access from the different sources in the processing system including the processor device and a graphics processor; and wherein the power manager is to load balance among the different sources, including the processor device and the graphics processor.

* * * * *